United States Patent
Patton

(10) Patent No.: US 12,069,399 B2
(45) Date of Patent: Aug. 20, 2024

(54) DYNAMICALLY SWITCHING BETWEEN RGB AND IR CAPTURE

(71) Applicant: Snap Inc., Santa Monica, CA (US)

(72) Inventor: Russell Douglas Patton, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/859,484

(22) Filed: Jul. 7, 2022

(65) Prior Publication Data

US 2024/0015260 A1  Jan. 11, 2024

(51) Int. Cl.
| | |
|---|---|
| H04N 5/268 | (2006.01) |
| G06T 7/20 | (2017.01) |
| H04N 23/56 | (2023.01) |
| H04N 23/74 | (2023.01) |

(Continued)

(52) U.S. Cl.
CPC ............. *H04N 5/268* (2013.01); *G06T 7/20* (2013.01); *H04N 23/56* (2023.01); *H04N 23/74* (2023.01); *H04N 23/76* (2023.01); *G02B 5/208* (2013.01); *G06T 2200/24* (2013.01); *G06T 2207/10024* (2013.01); *G06T 2207/10048* (2013.01); *G06T 2207/20084* (2013.01); *G06T 2207/30196* (2013.01)

(58) Field of Classification Search
CPC ........ H04N 5/268; H04N 23/76; H04N 23/74; H04N 23/56; G06T 7/20; G06T 2200/24; G06T 2207/10024; G06T 2207/10048; G06T 2207/20084; G06T 2207/20196; G02B 5/208

See application file for complete search history.

(56) References Cited

U.S. PATENT DOCUMENTS

| | | | |
|---|---|---|---|
| 7,971,156 B2 | 6/2011 | Albertson et al. | |
| 7,996,793 B2 | 8/2011 | Latta et al. | |

(Continued)

FOREIGN PATENT DOCUMENTS

| | | |
|---|---|---|
| CN | 103049761 | 8/2016 |
| CN | 113260951 | 8/2021 |

(Continued)

OTHER PUBLICATIONS

"International Application Serial No. PCT/US2023/069717, International Search Report mailed Oct. 20, 2023", 4 pgs.

(Continued)

*Primary Examiner* — James T Boylan
(74) *Attorney, Agent, or Firm* — Schwegman Lundberg & Woessner, P.A.

(57) ABSTRACT

Aspects of the present disclosure involve a system for capturing infrared (IR) images using an RGB camera. The system captures, by a camera of a client device, a first image comprising a visible light representing a real-world environment. The system receives a strobe signal for capturing an infrared (IR) image by the camera. In response to receiving the strobe signal, the system switches a filter associated with a lens of the camera to pass IR light to an image sensor of the camera, captures a second image comprising IR illumination of the real-world environment, and switches the filter after the second image is captured to allow visible light to pass through to the image sensor of the camera.

18 Claims, 10 Drawing Sheets

(51) Int. Cl.
*H04N 23/76* (2023.01)
*G02B 5/20* (2006.01)

(56) References Cited

U.S. PATENT DOCUMENTS

| | | | |
|---|---|---|---|
| 8,411,146 B2 * | 4/2013 | Twede | H04N 25/134 |
| | | | 348/148 |
| 8,446,470 B2 | 5/2013 | Lu et al. | |
| 8,487,938 B2 | 7/2013 | Latta et al. | |
| 8,856,691 B2 | 10/2014 | Geisner et al. | |
| 9,041,508 B2 | 5/2015 | Glickman et al. | |
| 9,225,897 B1 | 12/2015 | Sehn et al. | |
| 9,230,160 B1 | 1/2016 | Kanter | |
| 9,270,875 B2 | 2/2016 | Brisedoux et al. | |
| 9,276,886 B1 | 3/2016 | Samaranayake | |
| 9,692,967 B1 | 6/2017 | Bamberger et al. | |
| 9,705,831 B2 | 7/2017 | Spiegel | |
| 9,742,713 B2 | 8/2017 | Spiegel et al. | |
| 9,742,997 B1 | 8/2017 | Bamberger et al. | |
| 9,922,413 B2 | 3/2018 | Glickman et al. | |
| 10,062,050 B2 | 8/2018 | Lipsey et al. | |
| 10,102,423 B2 | 10/2018 | Shaburov et al. | |
| 10,187,853 B1 | 1/2019 | Bamberger et al. | |
| 10,284,508 B1 | 5/2019 | Allen et al. | |
| 10,304,162 B1 | 5/2019 | Duan et al. | |
| 10,353,532 B1 * | 7/2019 | Holz | G06F 3/04812 |
| 10,439,972 B1 | 10/2019 | Spiegel et al. | |
| 10,509,466 B1 | 12/2019 | Miller et al. | |
| 10,514,876 B2 | 12/2019 | Sehn | |
| 10,579,869 B1 | 3/2020 | Xiong et al. | |
| 10,591,730 B2 | 3/2020 | Rodriguez, II et al. | |
| 10,609,309 B1 * | 3/2020 | Ho | H01L 27/14625 |
| 10,614,855 B2 | 4/2020 | Huang | |
| 10,748,347 B1 | 8/2020 | Li et al. | |
| 10,823,553 B1 | 11/2020 | Ruther et al. | |
| 10,896,494 B1 | 1/2021 | Katz et al. | |
| 10,958,608 B1 | 3/2021 | Allen et al. | |
| 10,962,809 B1 | 3/2021 | Castañeda | |
| 10,984,575 B2 | 4/2021 | Assouline et al. | |
| 10,996,846 B2 | 5/2021 | Robertson et al. | |
| 10,997,787 B2 | 5/2021 | Ge et al. | |
| 11,010,908 B2 | 5/2021 | Ruther et al. | |
| 11,012,390 B1 | 5/2021 | Al Majid et al. | |
| 11,030,454 B1 | 6/2021 | Xiong et al. | |
| 11,030,793 B2 | 6/2021 | Katz | |
| 11,036,368 B1 | 6/2021 | Al Majid et al. | |
| 11,062,498 B1 | 7/2021 | Voss et al. | |
| 11,087,513 B1 | 8/2021 | Duan et al. | |
| 11,087,728 B1 | 8/2021 | Canberk et al. | |
| 11,089,427 B1 | 8/2021 | Canberk et al. | |
| 11,092,998 B1 | 8/2021 | Castañeda et al. | |
| 11,106,342 B1 | 8/2021 | Al Majid et al. | |
| 11,106,343 B1 | 8/2021 | Duan et al. | |
| 11,126,206 B2 | 9/2021 | Meisenholder et al. | |
| 11,143,867 B2 | 10/2021 | Rodriguez, II | |
| 11,146,763 B1 | 10/2021 | Katz | |
| 11,169,600 B1 | 11/2021 | Canberk et al. | |
| 11,178,375 B1 | 11/2021 | Katz et al. | |
| 11,189,104 B2 | 11/2021 | Goodrich et al. | |
| 11,195,341 B1 | 12/2021 | Canberk et al. | |
| 11,201,993 B1 * | 12/2021 | Wang | H04N 23/45 |
| 11,215,827 B1 | 1/2022 | Zhang | |
| 11,227,626 B1 | 1/2022 | Krishnan Gorumkonda et al. | |
| 11,269,402 B1 | 3/2022 | Canberk et al. | |
| 11,272,155 B2 | 3/2022 | Katz | |
| 11,275,453 B1 | 3/2022 | Tham et al. | |
| 11,277,597 B1 | 3/2022 | Canberk et al. | |
| 11,288,879 B2 | 3/2022 | Chen et al. | |
| 11,307,747 B2 | 4/2022 | Dancie et al. | |
| 11,320,667 B2 | 5/2022 | Hanover et al. | |
| 11,323,634 B2 | 5/2022 | Ma et al. | |
| 11,327,310 B1 | 5/2022 | Bates et al. | |
| 11,348,265 B1 | 5/2022 | Nielsen et al. | |
| 11,531,402 B1 | 12/2022 | Stolzenberg | |
| 11,546,505 B2 | 1/2023 | Canberk | |
| 2009/0012788 A1 | 1/2009 | Gilbert et al. | |
| 2011/0301934 A1 | 12/2011 | Tardif | |
| 2013/0278631 A1 * | 10/2013 | Border | G06F 3/04842 |
| | | | 345/633 |
| 2014/0132775 A1 * | 5/2014 | Fischer | H04N 23/11 |
| | | | 348/164 |
| 2014/0171036 A1 | 6/2014 | Simmons | |
| 2015/0120293 A1 | 4/2015 | Wohlert et al. | |
| 2015/0317464 A1 * | 11/2015 | Willis | G06V 40/19 |
| | | | 348/78 |
| 2015/0370320 A1 | 12/2015 | Connor | |
| 2016/0065850 A1 | 3/2016 | Yu et al. | |
| 2016/0165214 A1 | 6/2016 | Kim | |
| 2016/0227195 A1 | 8/2016 | Venkataraman et al. | |
| 2017/0123487 A1 | 5/2017 | Hazra et al. | |
| 2017/0140221 A1 * | 5/2017 | Ollila | G02F 1/157 |
| 2017/0277684 A1 | 9/2017 | Dharmarajan Mary | |
| 2017/0277685 A1 | 9/2017 | Takumi | |
| 2017/0351910 A1 | 12/2017 | Elwazer et al. | |
| 2018/0005420 A1 | 1/2018 | Bondich et al. | |
| 2018/0158370 A1 | 6/2018 | Pryor | |
| 2018/0338089 A1 * | 11/2018 | Choi | G02B 5/208 |
| 2019/0082519 A1 | 3/2019 | Gagne-keats | |
| 2019/0146219 A1 | 5/2019 | Rodriguez, II | |
| 2019/0180085 A1 * | 6/2019 | Wen | G06V 10/143 |
| 2020/0033875 A1 | 1/2020 | An | |
| 2020/0077027 A1 | 3/2020 | Onaka | |
| 2020/0098114 A1 | 3/2020 | Kudriashov et al. | |
| 2020/0104039 A1 | 4/2020 | Robertson et al. | |
| 2020/0234480 A1 | 7/2020 | Volkov et al. | |
| 2020/0234508 A1 | 7/2020 | Shaburov et al. | |
| 2020/0258189 A1 | 8/2020 | Chen et al. | |
| 2020/0294195 A1 | 9/2020 | Wang et al. | |
| 2020/0401838 A1 | 12/2020 | Gusarov | |
| 2021/0003453 A1 | 1/2021 | Ruther et al. | |
| 2021/0003454 A1 | 1/2021 | Ruther et al. | |
| 2021/0011612 A1 | 1/2021 | Dancie et al. | |
| 2021/0027100 A1 | 1/2021 | Bogdanovych et al. | |
| 2021/0065448 A1 | 3/2021 | Goodrich et al. | |
| 2021/0065464 A1 | 3/2021 | Goodrich et al. | |
| 2021/0067756 A1 | 3/2021 | Goodrich et al. | |
| 2021/0074016 A1 | 3/2021 | Li et al. | |
| 2021/0099685 A1 | 4/2021 | Katz | |
| 2021/0112230 A1 | 4/2021 | Katz | |
| 2021/0166732 A1 | 6/2021 | Shaburova et al. | |
| 2021/0174034 A1 | 6/2021 | Retek et al. | |
| 2021/0183033 A1 | 6/2021 | Chung et al. | |
| 2021/0200390 A1 | 7/2021 | Luo et al. | |
| 2021/0203627 A1 | 7/2021 | Luo et al. | |
| 2021/0203628 A1 | 7/2021 | Luo et al. | |
| 2021/0211616 A1 * | 7/2021 | Wang | H04N 23/11 |
| 2021/0225077 A1 | 7/2021 | Ge et al. | |
| 2021/0231953 A1 | 7/2021 | Rodriguez, II et al. | |
| 2021/0241529 A1 | 8/2021 | Cowburn et al. | |
| 2021/0274108 A1 * | 9/2021 | Kirisken | H04N 23/11 |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0303826 A1 | 9/2021 | Voss et al. | |
| 2021/0319540 A1 | 10/2021 | Cao et al. | |
| 2021/0382564 A1 | 12/2021 | Blachly et al. | |
| 2021/0397000 A1 | 12/2021 | Rodriguez, II | |
| 2021/0405746 A1 | 12/2021 | Canberk et al. | |
| 2021/0405761 A1 | 12/2021 | Canberk | |
| 2021/0406585 A1 | 12/2021 | Hoevenaar | |
| 2021/0407178 A1 | 12/2021 | Zhou et al. | |
| 2021/0407205 A1 | 12/2021 | Canberk et al. | |
| 2022/0020194 A1 | 1/2022 | Luo et al. | |
| 2022/0078395 A1 | 3/2022 | Katz et al. | |
| 2022/0099972 A1 | 3/2022 | Birklbauer et al. | |
| 2022/0100812 A1 | 3/2022 | Anvaripour et al. | |
| 2022/0101404 A1 | 3/2022 | Boscolo et al. | |
| 2022/0101606 A1 | 3/2022 | Canberk et al. | |
| 2022/0103757 A1 | 3/2022 | Ding et al. | |
| 2022/0109820 A1 | 4/2022 | Ryuma et al. | |
| 2022/0156999 A1 | 5/2022 | Assouline et al. | |
| 2022/0157025 A1 | 5/2022 | Assouline et al. | |
| 2022/0159178 A1 | 5/2022 | Bartow et al. | |
| 2022/0182777 A1 | 6/2022 | Canberk et al. | |

(56) References Cited

U.S. PATENT DOCUMENTS

| | | |
|---|---|---|
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0301231 A1 | 9/2022 | Eirinberg et al. |
| 2022/0326781 A1 | 10/2022 | Hwang et al. |
| 2022/0334649 A1 | 10/2022 | Hwang et al. |
| 2022/0375174 A1 | 11/2022 | Arya et al. |
| 2023/0071384 A1* | 3/2023 | Agarwal ............... B25J 13/089 |
| 2023/0148351 A1* | 5/2023 | Kadar ................. G08G 1/0133 |
| | | 348/149 |

FOREIGN PATENT DOCUMENTS

| | | |
|---|---|---|
| EP | 3274916 | 1/2018 |
| EP | 3707693 | 9/2020 |
| EP | 3912092 | 11/2021 |
| EP | 3912160 | 11/2021 |
| EP | 4172726 | 5/2023 |
| EP | 4172730 | 5/2023 |
| KR | 20200049895 | 5/2020 |
| KR | 20210046822 | 4/2021 |
| KR | 20220033924 A | 3/2022 |
| KR | 20220051376 | 4/2022 |
| KR | 20220158824 | 12/2022 |
| WO | 2016168591 | 10/2016 |
| WO | 2019094618 | 5/2019 |
| WO | 2020131526 | 6/2020 |
| WO | 2020160261 | 8/2020 |
| WO | 2021119408 | 6/2021 |
| WO | 2021138630 | 7/2021 |
| WO | 2021188269 | 9/2021 |
| WO | 2021212133 | 10/2021 |
| WO | 2021222107 | 11/2021 |
| WO | 2021242634 | 12/2021 |
| WO | 2021242688 | 12/2021 |
| WO | 2021252242 | 12/2021 |
| WO | 2022005687 | 1/2022 |
| WO | 2022005693 | 1/2022 |
| WO | 2022005698 | 1/2022 |
| WO | 2022005708 | 1/2022 |
| WO | 2022005720 | 1/2022 |
| WO | 2022005726 | 1/2022 |
| WO | 2022005733 | 1/2022 |
| WO | 2022005734 | 1/2022 |
| WO | 2022005946 | 1/2022 |
| WO | 2022005970 | 1/2022 |
| WO | 2022066573 | 3/2022 |
| WO | 2022066578 | 3/2022 |
| WO | 2022066853 | 3/2022 |
| WO | 2022060549 | 4/2022 |
| WO | 2022072167 | 4/2022 |
| WO | 2022072168 | 4/2022 |
| WO | 2022072187 | 4/2022 |
| WO | 2022072192 | 4/2022 |
| WO | 2022072197 | 4/2022 |
| WO | 2022072205 | 4/2022 |
| WO | 2022072404 | 4/2022 |
| WO | 2022072418 | 4/2022 |
| WO | 2022072497 | 4/2022 |
| WO | 2022072505 | 4/2022 |
| WO | 2022072983 | 4/2022 |
| WO | 2022093958 | 5/2022 |
| WO | 2022108806 | 5/2022 |
| WO | 2022119697 | 6/2022 |
| WO | 2022125280 | 6/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |
| WO | WO-2024011181 A1 | 1/2024 |

OTHER PUBLICATIONS

"International Application Serial No. PCT/US2023/069717, Written Opinion mailed Oct. 20, 2023", 4 pgs.

* cited by examiner ical system (MEMS) that is controlled electronically to be switched between two modes. In a first mode, the filter allows visible light reflections to pass to the image sensor. In a second mode, the filter blocks visible light reflections and allows IR illumination to pass to the image sensor.

DYNAMICALLY SWITCHING BETWEEN RGB AND IR CAPTURE

TECHNICAL FIELD

The present disclosure relates generally to providing augmented reality (AR) experiences using a messaging application.

BACKGROUND

AR is a modification of a virtual environment. For example, in virtual reality (VR), a user is completely immersed in a virtual world, whereas in AR, the user is immersed in a world where virtual objects are combined with or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
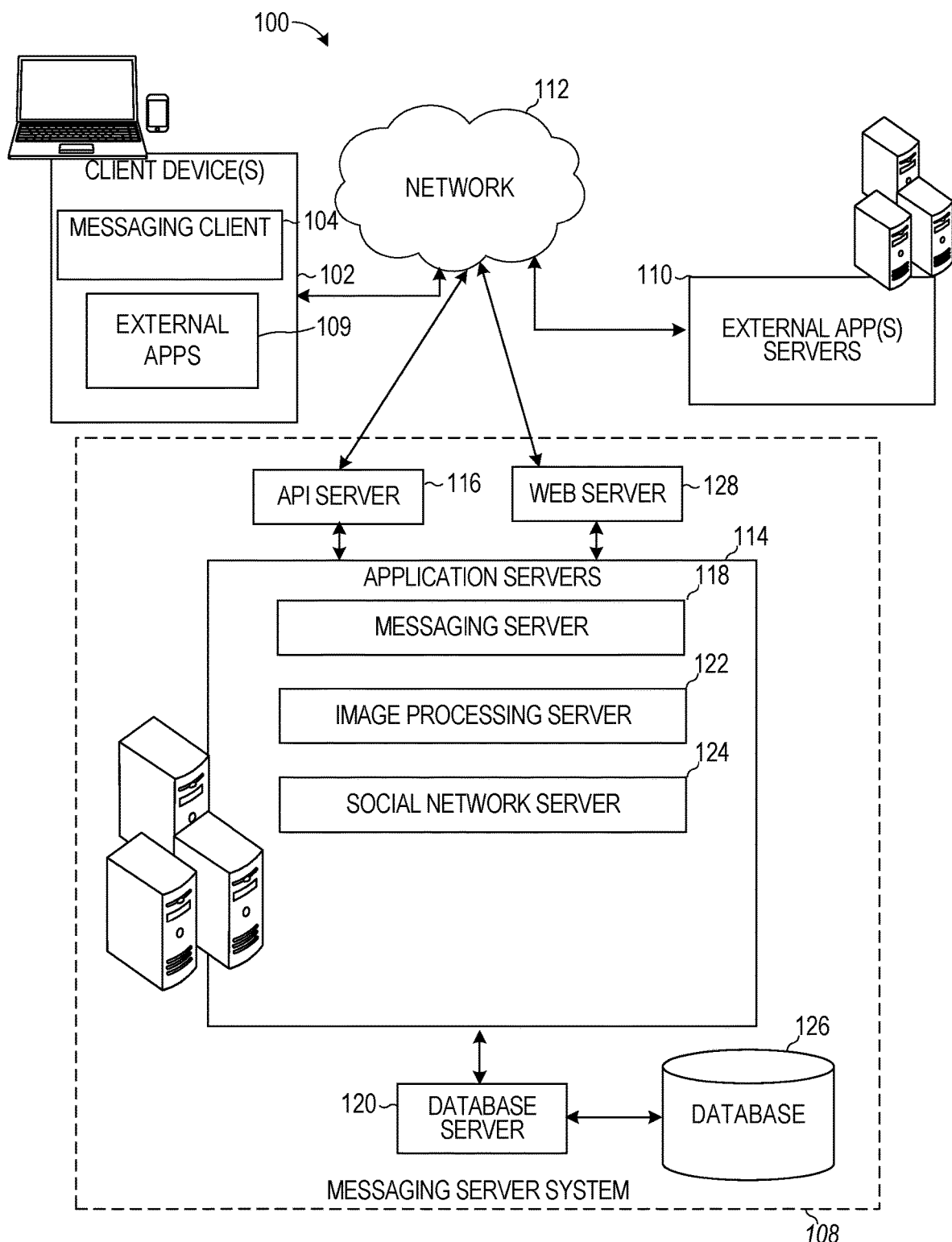
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

AR systems typically use a variety of sensors to accurately detect and track real-world objects that are in a real-world environment. For example, the AR systems usually include a visible image camera, such as a red, green, and blue (RGB) camera to capture visible light based images. These can be used to identify real-world scene elements and to obtain context of a scene. The AR systems also include IR sensors and IR cameras that are separate from the visible light cameras. These IR sensors and IR cameras are used to track certain objects to perform various AR operations. As such systems become implemented on resource constrained devices, like AR glasses or other AR mobile devices, the total available physical resource space needs to be considered. Also, the hardware and software requirements of such systems need to operate efficiently to preserve battery life of the devices.

One way to preserve and reduce the amount of physical resource space used by mobile AR systems is to have the visible light camera capture a single image that depicts both visible light and IR reflections of the real-world environment. Such images can then be processed to detect and track objects. However, a single image that includes IR reflections and visible light reflections usually tends to provide a poor or inaccurate representation of the real-world environment and can lead to errors in performing AR operations. Some other systems adapt the tracking and object detection algorithms to process such images or to avoid using IR reflections. However, the complexities involved in modifying such algorithms end up using more software resources and reducing the battery life of the mobile AR device.

The disclosed techniques solve these technical issues by providing a switchable filter in association with a visible light camera to dynamically capture a set of visible light images and another set of IR images. Namely, the disclosed techniques use a single camera to perform both functions, capturing visible light images and IR images. This reduces the amount of resources needed on the mobile AR devices to implement various AR operations, such as hand tracking or object tracking. Also, by using one sensor (e.g., a camera) instead of multiple sensors (e.g., a camera and an IR sensor) to capture the information used to track objects and perform AR operations, the physical resources used by the disclosed techniques are reduced. This makes the disclosed techniques improve applicability in mobile devices.

Specifically, the disclosed techniques provide a filter in front of a lens of a camera or between a lens and an image sensor of the camera. The filter is activated to selectively pass visible light or IR illuminations of a real-world environment. When the filter is set (e.g., positioned in front of the lens) to pass visible light (and block IR illuminations), the image sensor and camera captures an RGB image (image that includes RGB pixels) or visible light representation of a real-world environment. In response to receiving a strobe signal, the filter is set (e.g., removed from being in front of the lens) to block visible light and allow IR illumination to pass. In this way, the image sensor can capture an IR illumination of the real-world environment. In some cases, the two images (visible light image and IR illumination image) are processed together or separately to perform AR operations. In some examples, the filter is a mechanical filter that is mechanically positioned in place to block or pass certain spectrums of light or IR illumination. In some examples, the filter is implemented as a micro-electromechanical systems (MEMS) device and is electronically controlled to pass/block certain spectrums of light.

In these ways, the techniques described herein improve the efficiency of using the electronic device and the overall experience of the user in using the electronic device.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications (also referred to as "external applications" and "external apps") 109 using Application Program Interfaces (APIs).

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

A messaging client 104 (sometimes referred to as a client application) is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections, the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
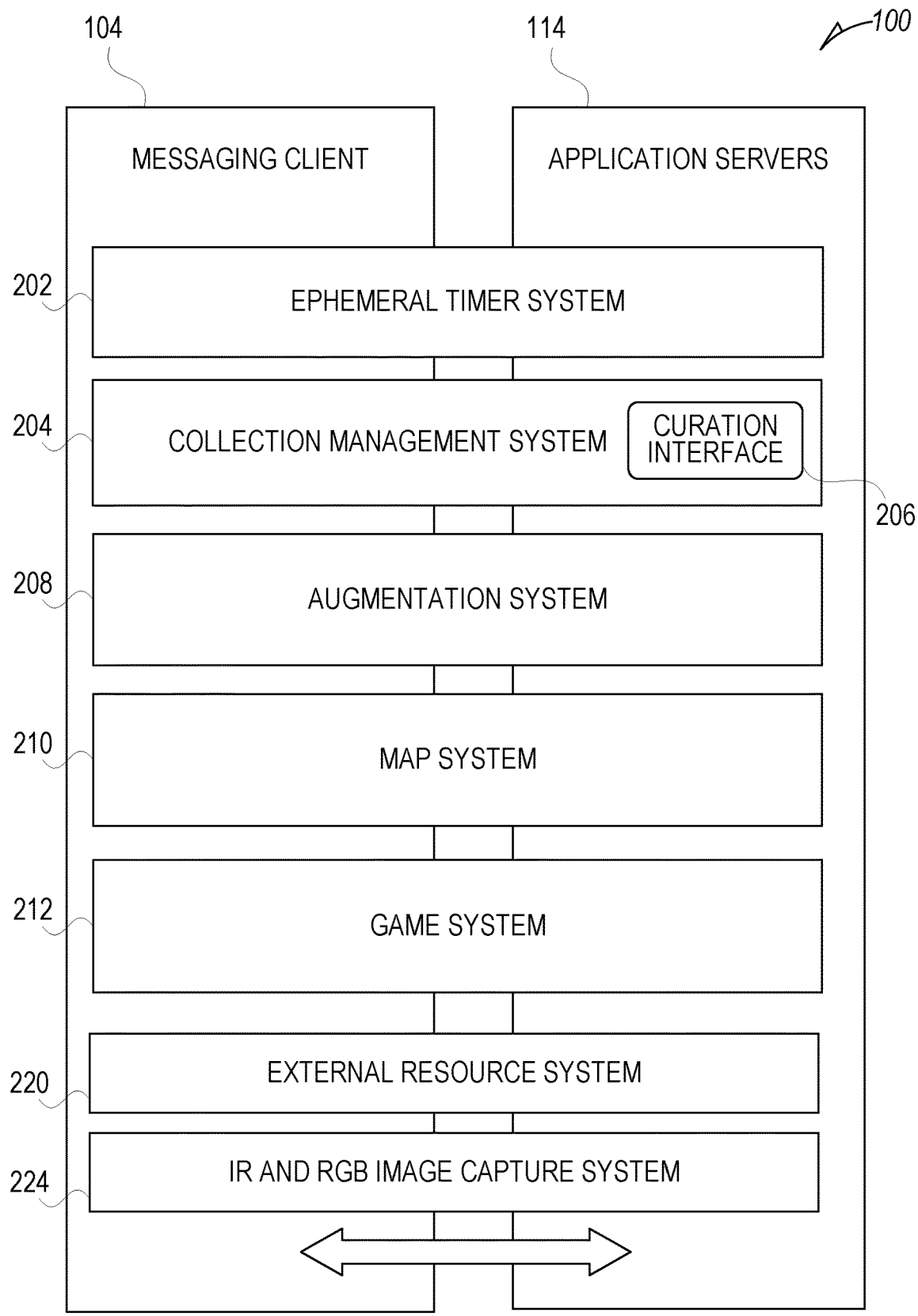
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification (e.g., launching an AR experience, as discussed in connection with FIGS. 6-10 below).

Figure 3:
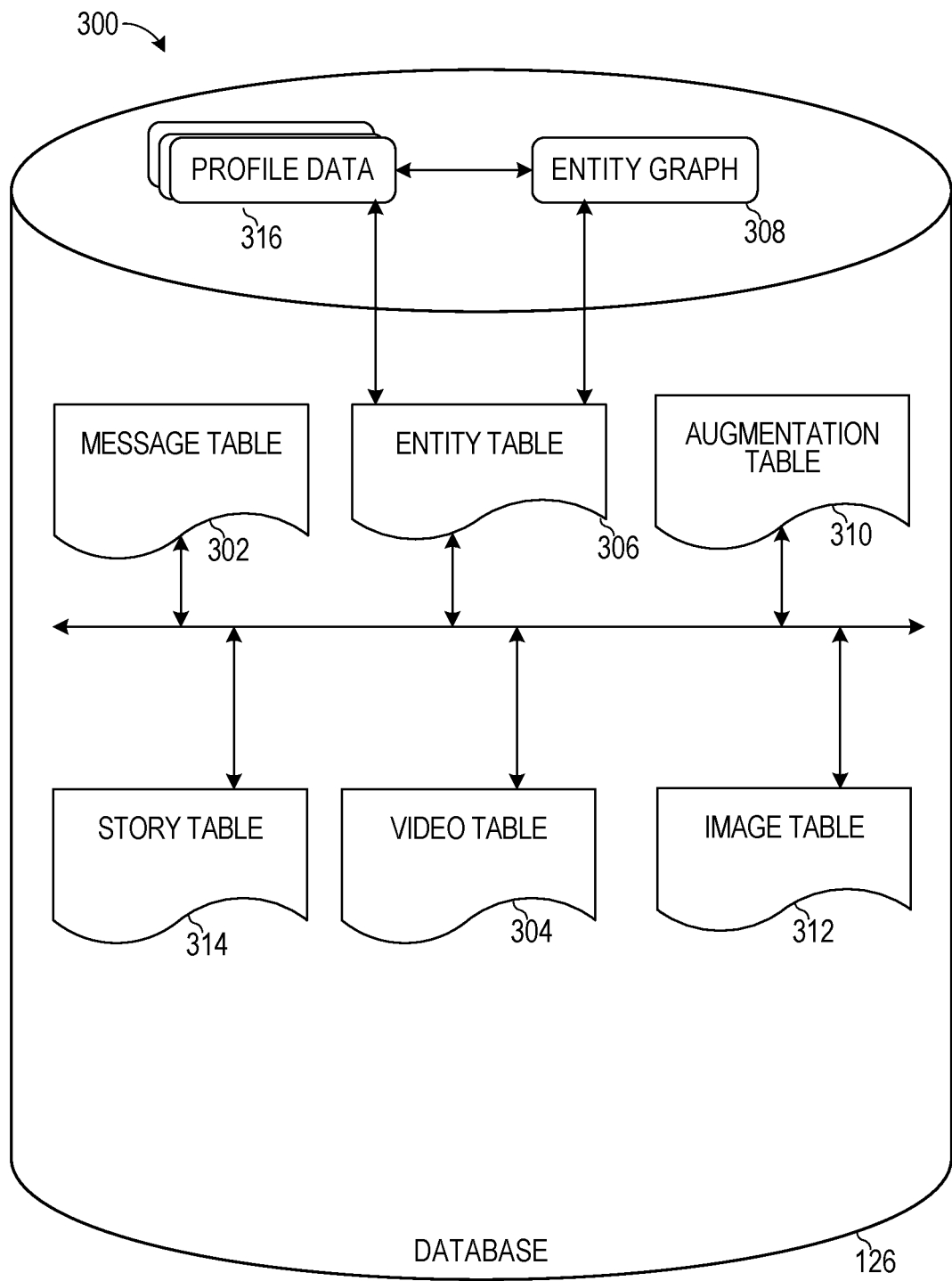
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external resource or app(s) servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (e.g., external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external applications 109 (or applets) can vary based on how the menu is launched by the user (e.g., from a conversation interface or from a non-conversation interface).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, an external resource system 220, and an IR and RGB image capture system 224.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more user interfaces (e.g., as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, and functions (e.g., commands to invoke functions) as well as other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access to the shared AR session. In some examples, the client devices 102 are able to access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game by issuing invitations to such other users from the messaging client 104. The messaging client 104 also supports both voice and text messaging (e.g., chats) within the context of gameplay, provides a leaderboard for the games, and supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a Web ViewJavaScript-Bridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a graphical user interface (GUI) of the messaging client 104 to access features of the web-based external resource, the messaging client 104 obtains the HTML5 file and instantiates the resources necessary to access the features of the web-based external resource.

The messaging client 104 presents a GUI (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another GUI of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, 3D avatars of users, and avatars with various avatar characteristics). Avatar characteristics include different ways to customize a look and feel of an avatar, such as different poses, facial features, clothing, and so forth.

The IR and RGB image capture system 224 leverages a single visible light camera (e.g., an RGB camera) to capture both visible light images (e.g., RGB images) and IR images in an interleaved manner. For example, an IR filter can be placed in association with a camera (e.g., in front of a lens of a camera of the client device 102 and/or between the lens and an image sensor of the camera). The IR filter can block all light except IR spectrum light reflections. When the IR filter is placed in association with the camera, any image captured by the camera can be processed to obtain tracking information based on depth information determined by the IR reflections of the light. When the IR filter is removed from a path of light received by the camera, the images captured by the camera include visible light images (e.g., RGB images) and, optionally IR reflections (if an IR illumination device is active). These visible light images can be used to generate various AR experiences that are presented to a user. In some examples, in addition to or alternative to an IR filter, a visible light filter can be used. In such cases, the visible light filter, when placed in association with the camera, allows all visible light and blocks IR reflections of light from being received by the image sensor of the camera.

In this way, physical and software resources of a client device 102 are minimized and reduced in providing AR experiences on the client device 102 as fewer hardware resources are needed because a single camera can perform the function of two or more sensors or devices.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interested-based, or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, and settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying AR experiences). An AR content item or AR item may be a real-time special effect and sound that may be added to an image or a video.

As described above, augmentation data includes AR content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one elements of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh.

In such a method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one elements, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an ASM algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine-taught neural networks may be used to enable such modifications.

The GUI, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a GUI. In some examples, individual faces, among a group of multiple faces, may be individually modified, or such modifications may be individually toggled by tapping or selecting the individual face or a series of individual faces displayed within the GUI.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The data structures 300 can also store training data for training one or more machine learning techniques (models) to segment real-world objects or items of real-world environment depicted in an image corresponding to a location (e.g., a room in a home). The training data can include a plurality of images and videos and their corresponding ground-truth room segmentations. The images and videos can include a mix of all sorts of real-world objects that can appear in different rooms in a home or household. The one or more machine learning techniques can be trained to extract features of a received input image or video and establish a relationship between the extracted features and a segmentations. Once trained, the machine learning technique can receive a new image or video and can compute a segmentation of items depicted in the newly received image or video.

Data Communications Architecture

Figure 4:
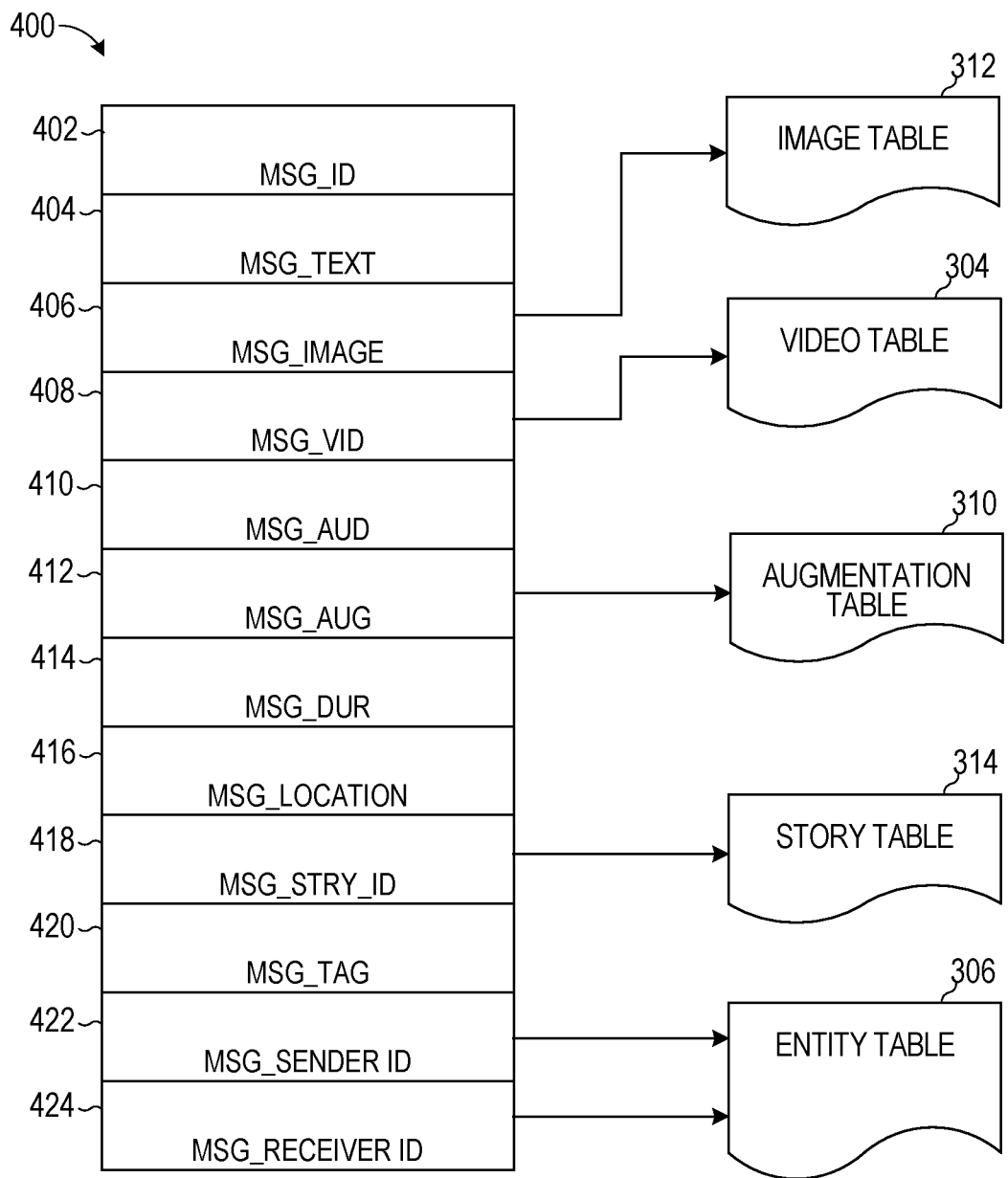
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data 412 for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

IR and RGB Image Capture System

Figure 5:
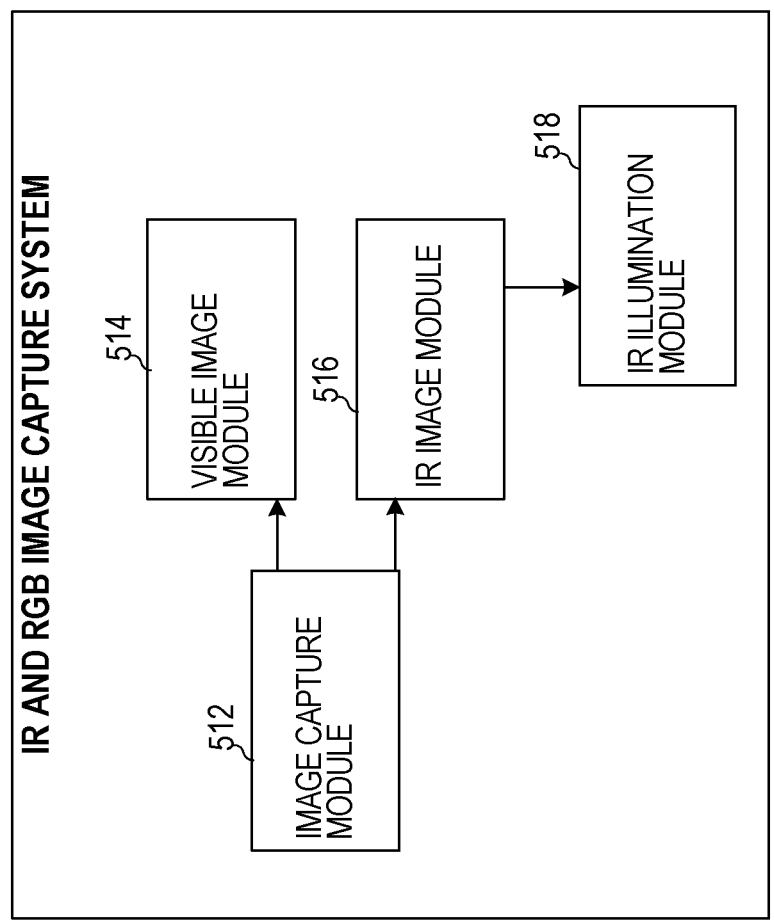
FIG. 5 is a diagrammatic representation of the IR and RGB image capture system, in accordance with some examples.

FIG. 5 is a diagrammatic representation of the IR and RGB image capture system 224, in accordance with some examples. The IR and RGB image capture system 224 can include an image capture module 512, a visible image module 514, an IR image module 516, and/or an IR illumination module 518.

The image capture module 512 includes or is associated with a camera of a client device 102. The camera can include an image sensor, such as a CMOS image sensor, a lens, and one or more filters. The image capture module 512 may include an AR experience controller. The image capture module 512 communicates with the visible image module 514 and the IR image module 516 to obtain one or more visible light images and one or more IR illumination images of a real-world environment. The image capture module 512 can implement one or more machine learning models to process the visible light images and the IR illumination images to generate and provide one or more AR experiences.

For example, the image capture module 512 receives visible light images and presents the images on a display as a real-time video feed captured by the camera. The image capture module 512 can add one or more virtual AR elements to the displayed images. The image capture module 512 can process the visible light images to identify one or more real-world objects (e.g., a real-world hand) depicted in the images. The image capture module 512 can select the types of the one or more virtual AR elements based on the identified one or more real-world objects depicted in the images.

In some examples, the image capture module 512 processes the IR illuminated images to track positions and changes associated with the one or more real-world objects and/or one or more other real-world objects. Based on tracking the real-world objects, the image capture module 512 updates the one or more virtual AR elements and/or performs one or more other functions. For example, the image capture module 512 identifies a gesture performed by the real-world object based on the IR illuminated images and/or the visible light images of the real-world object. Based on the gesture, the image capture module 512 performs a corresponding function, such as turning or rotating or activating an AR element.

In some examples, in order to capture a visible light image, the image capture module 512 transmits a message to the visible image module 514 to enable the image sensor to receive visible light representing a real-world environment. Based on the visible light the image sensor receives, the image sensor generates an image that includes red, green, and blue pixels depicting the real-world environment. The visible image module 514 may, in response to the message, transition or switch a filter that allows visible light to pass to be engaged or activated. For example, the visible image module 514 can place the filter in front of the lens of the camera of the client device. As another example, the visible image module 514 can place the filter in a light path between the lens and the image sensor of the camera. In some examples, the visible image module 514 can remove an IR filter (configured to block all light except IR reflections or light in the IR spectrum) that is in the light path from the real-world environment to the image sensor to allow all visible light to pass through. In some examples, the visible image module 514 places the IR filter (configured to block IR reflections or light in the IR spectrum) in the light path to block IR reflections. This can improve the image quality captured by the image sensor.

Specifically, the visible image module 514 can place a visible light filter that allows all visible light to pass and an IR filter that blocks IR reflections in the light path to the image sensor (e.g., in front of the lens of the camera or between the lens and the image sensor). In some cases, the visible image module 514 can remove all filters from being in the light path to the image sensor. In some cases, the visible image module 514 can only place an IR filter to block IR reflections that are in the light path.

In some cases, the visible light and/or IR filter(s) can be mechanically moved into position to be placed in the light path. In some cases, the visible light and/or IR filter(s) are implemented by MEMS devices and can be electronically activated to perform the light passing and/or blocking functions. Any combination of mechanical and/or MEMS filtering devices can be used to perform the disclosed functions and operations.

In some examples, in order to capture an IR image (e.g., image that includes an IR illumination of the real-world environment), the image capture module 512 transmits a message to the IR image module 516 to enable the image sensor to receive IR illuminations or IR reflections of the real-world environment. The IR image module 516, in response to the message, communicates with an IR illumination module 518 to temporarily turn on an IR illumination device or emitter. The IR illumination device or emitter may continuously be turned ON or may be turned ON for the period of time needed to capture an IR reflection of light in an image by the image sensor. Namely, the IR image module 516 can instruct the IR illumination module 518 to turn ON the IR illumination device while the IR image module 516 places a filter in the light path to an image sensor to allow only IR spectrum of light to pass to the image sensor. The IR illuminator of the IR illumination module 518 can be a component of the camera and controlled by the camera controller or an external signal from a system controller or processor. In some examples, the IR illumination module 518 is external to the camera and can be controlled by the camera controller or system controller or processor.

In some examples, the IR image module 516 transitions or switches an IR filter that allows IR light to pass to an engaged or activated mode. For example, the IR image module 516 can place the IR filter in front of the lens of the camera of the client device to block all light except IR reflections or light in the IR spectrum. As another example, the IR image module 516 can place the filter in a light path between the lens and the image sensor of the camera. In some examples, the visible image module 514 can remove a visible light filter (configured to block IR light except visible light) that is in the light path from the real-world environment to the image sensor to allow only IR light to pass through. In some examples, the IR image module 516 places the visible light filter (configured to block visible light) in the light path to block visible light reflections.

Specifically, the IR image module 516 can place an IR light filter that allows IR light to pass and a visible light filter that blocks visible light in the light path to the image sensor (e.g., in front of the lens of the camera or between the lens and the image sensor). In some cases, the IR image module 516 only places a visible light filter to block visible light reflections that are in the light path.

Figure 6:
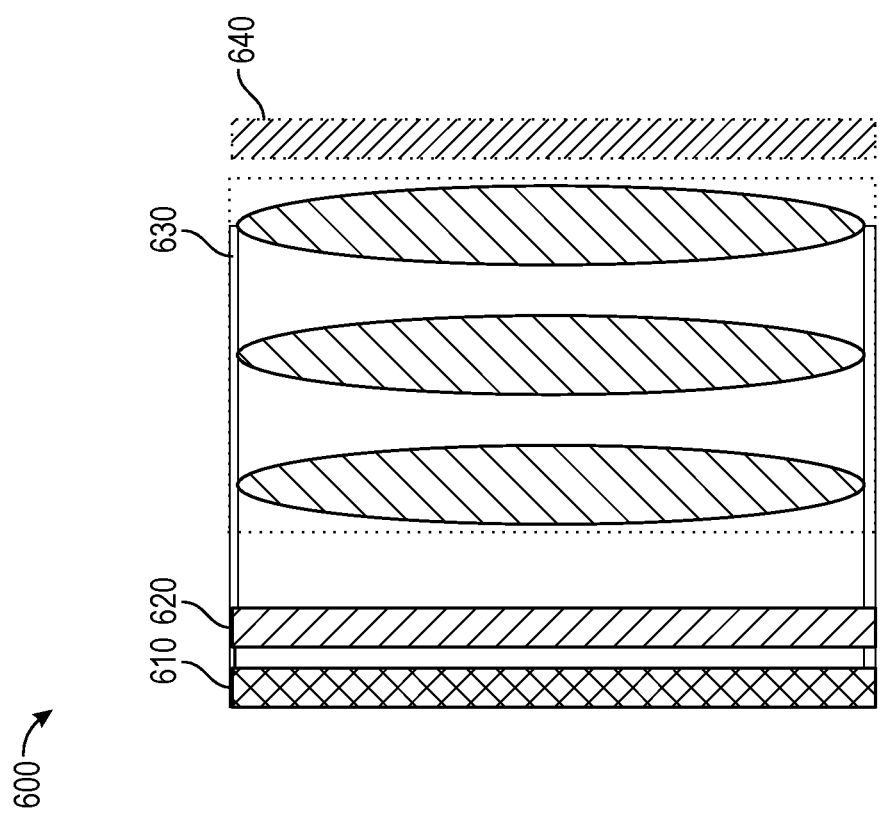
FIGS. 6 and 7 are diagrammatic representations of operations of the IR and RGB image capture system, in accordance with some examples.
Figure 7:
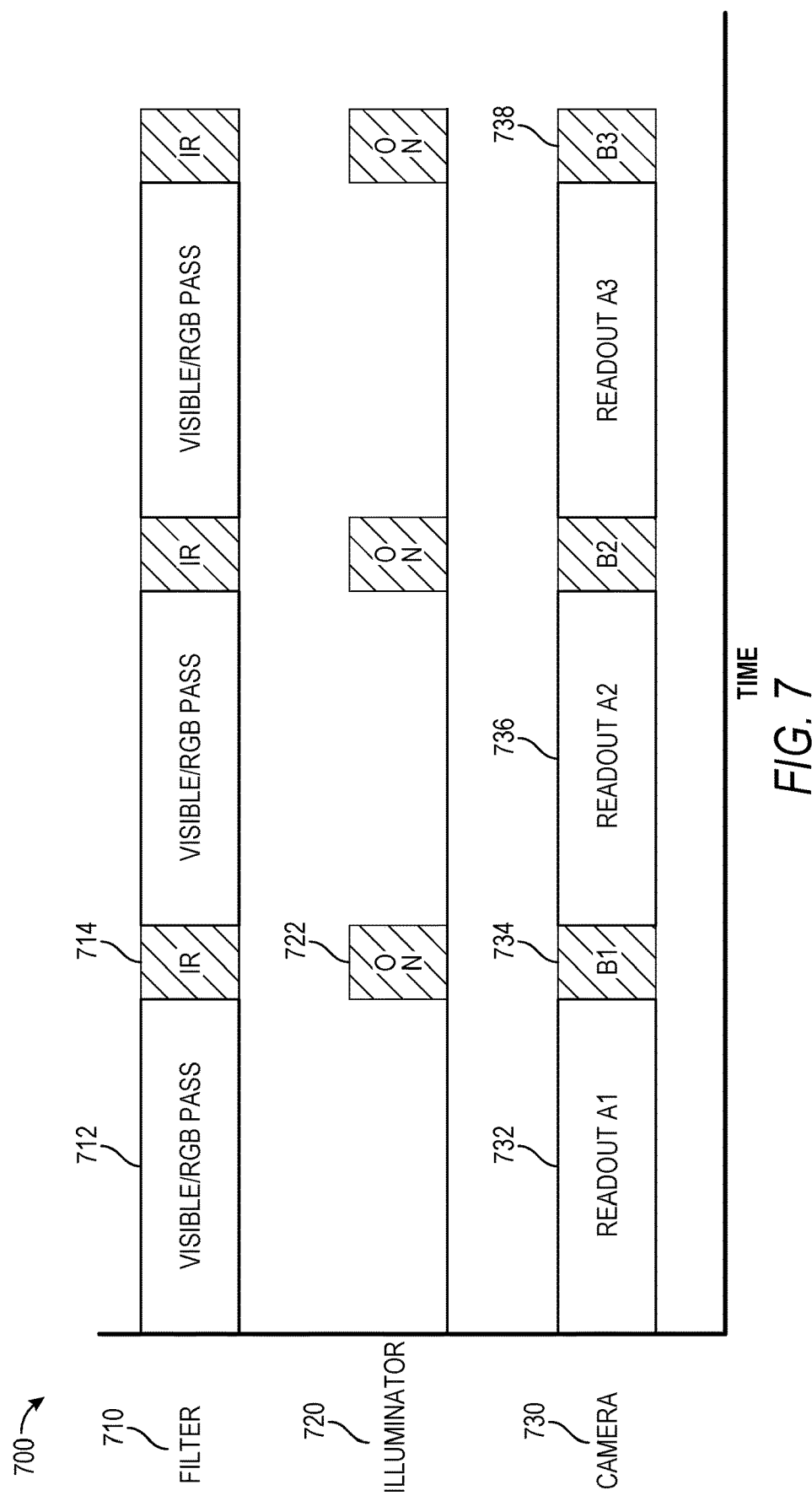

FIGS. 6 and 7 are diagrammatic representations of operations of the IR and RGB image capture system 224. As shown in FIG. 6, the IR and RGB image capture system 224 includes an image sensor 610, one or more lenses 630, and one or more filters 620 and 640. In some cases, the IR and RGB image capture system 224 includes only the filter 620. In some cases, the IR and RGB image capture system 224 includes only the filter 640. To capture a visible light image, the IR and RGB image capture system 224 can place an IR filter, such as filter 640, in the light path from the real-world environment to the image sensor 610. The IR filter can block all IR light and pass all visible light. In another implementation, the IR and RGB image capture system 224 can place the IR filter, such as filter 620, in the light path from the real-world environment to the image sensor 610.

In some cases, to capture an IR image (e.g., image representing IR illuminations of a real-world environment), the IR and RGB image capture system 224 can place a visible light filter, such as filter 640, in the light path from the real-world environment to the image sensor 610. The visible light filter can block all visible light and pass light in the IR spectrum. In another implementation, the IR and RGB image capture system 224 can place the visible light filter, such as filter 620, in the light path from the real-world environment to the image sensor 610.

As shown in FIG. 7, an example timing diagram 700 represents the capture of a sequence of visible light images and IR images by the same visible light camera of the client device 102. Specifically, the timing diagram 700 represents timing operations of the filter 710 of the camera of the client device 102, an illuminator 720, and the image sensor or camera 730. In some examples, at a first point in time 712, the image capture module 512 instructs the filter 710 to be configured to allow all visible light to pass. For example, the IR filter 710 can be placed in the light path to the image sensor to block all IR reflections of light. Concurrently with the filter 710 allowing all visible light to pass, the camera 730 captures a sequence of visible light images 732 (which can include a sequence of frames of a video).

The image capture module 512 can determine a need to capture an IR image. In response, the image capture module 512 transmits a strobe signal or control signal by transmitting an ON message 722 at a second point in time. In response to the strobe signal or control signal, the IR illumination module 518 activates an IR illumination device, such as illuminator 720 (while the illuminator 720 is active or the ON message 722 is asserted). Also, while the illuminator 720 is active or the ON message 722 is asserted, the filter 710 places a visible light filter or an IR filter to block all visible light and allow only IR spectrums of light to pass through the light path to the image sensor. This filter is placed for a period of time 714 shown in the timing diagram 700. In addition, while the illuminator 720 is active or the ON message 722 is asserted, the camera captures one or more IR images 734 (e.g., images for which all light except IR spectrums of light have been blocked by the filter). In this way, the IR images 734 are interleaved or multiplexed with the visible light image 732.

Once the one or more IR images 734 have been captured or received by the image sensor, the image capture module 512 de-asserts the ON message 722 (to turn OFF the illuminator 720). In response, the visible light filter and/or IR filter is removed to allow visible light to pass through to be received by the image sensor and, optionally, block IR spectrums of light. Also, the camera now captures another sequence of visible light images 736. This enables the same camera to capture a multiplexed or interleaved stream of images 738 that includes a collection of visible light images and a collection of IR images. In this way, as shown in FIG. 7, the camera is synchronized with the illuminator 720 so that an IR image can be captured simultaneously with the IR illuminator 720 being turned ON.

Figure 8:
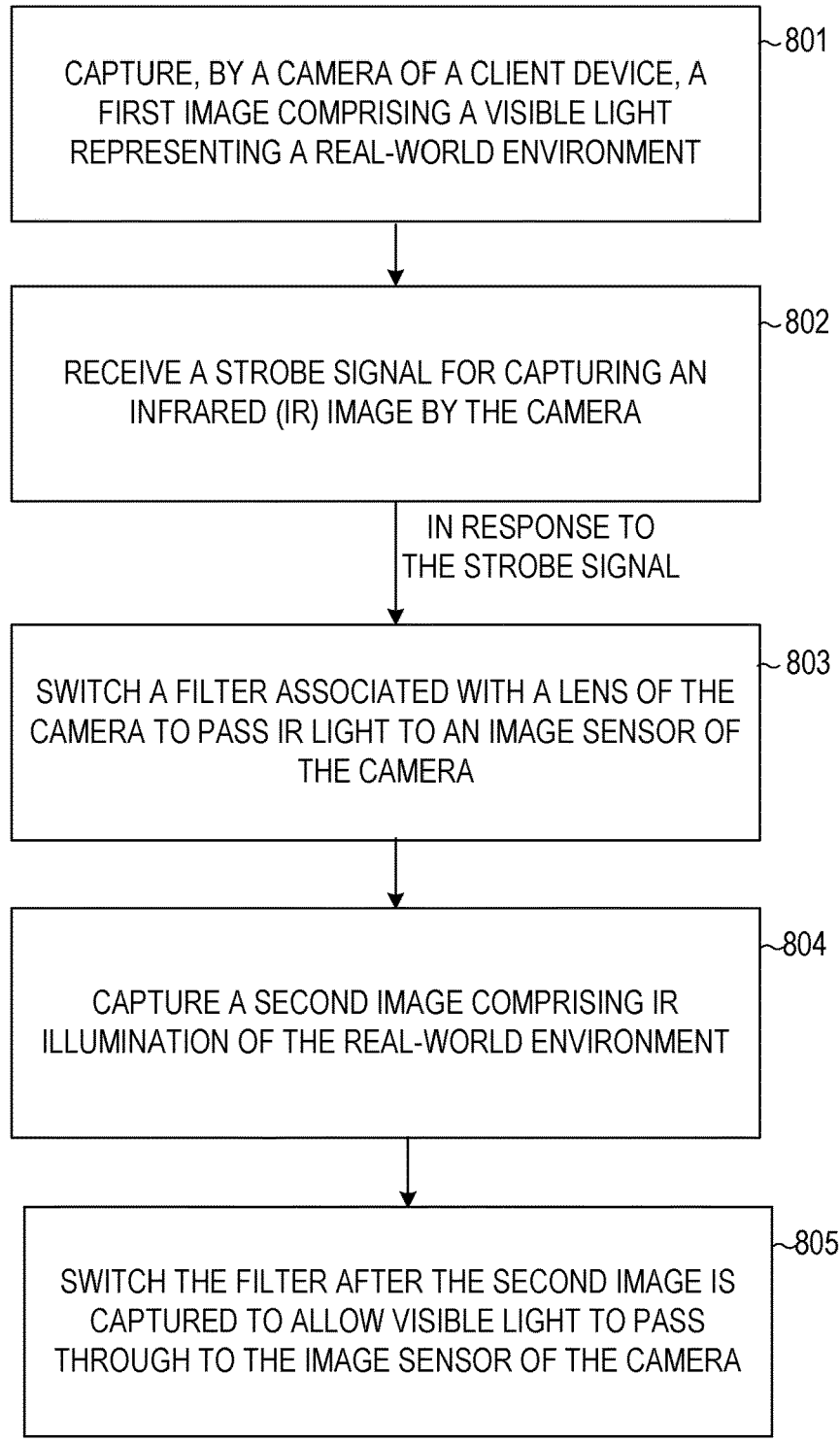
FIG. 8 is a flowchart illustrating example operations of the IR and RGB image capture system, according to some examples.

FIG. 8 is a flowchart of a process 800, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 801, a client device 102 captures, by a camera of a client device, a first image comprising a visible light representing a real-world environment, as discussed above.

At operation 802, the client device 102 receives a strobe signal for capturing an infrared (IR) image by the camera, as discussed above.

At operation 803, the client device 102 switches a filter associated with a lens of the camera to pass IR light to an image sensor of the camera in response to the strobe signal, as discussed above.

At operation 804, the client device 102 captures a second image comprising IR illumination of the real-world environment in response to the strobe signal, as discussed above.

At operation 805, the client device 102 switches the filter after the second image is captured to allow visible light to pass through to the image sensor of the camera, as discussed above.

Machine Architecture

Figure 9:
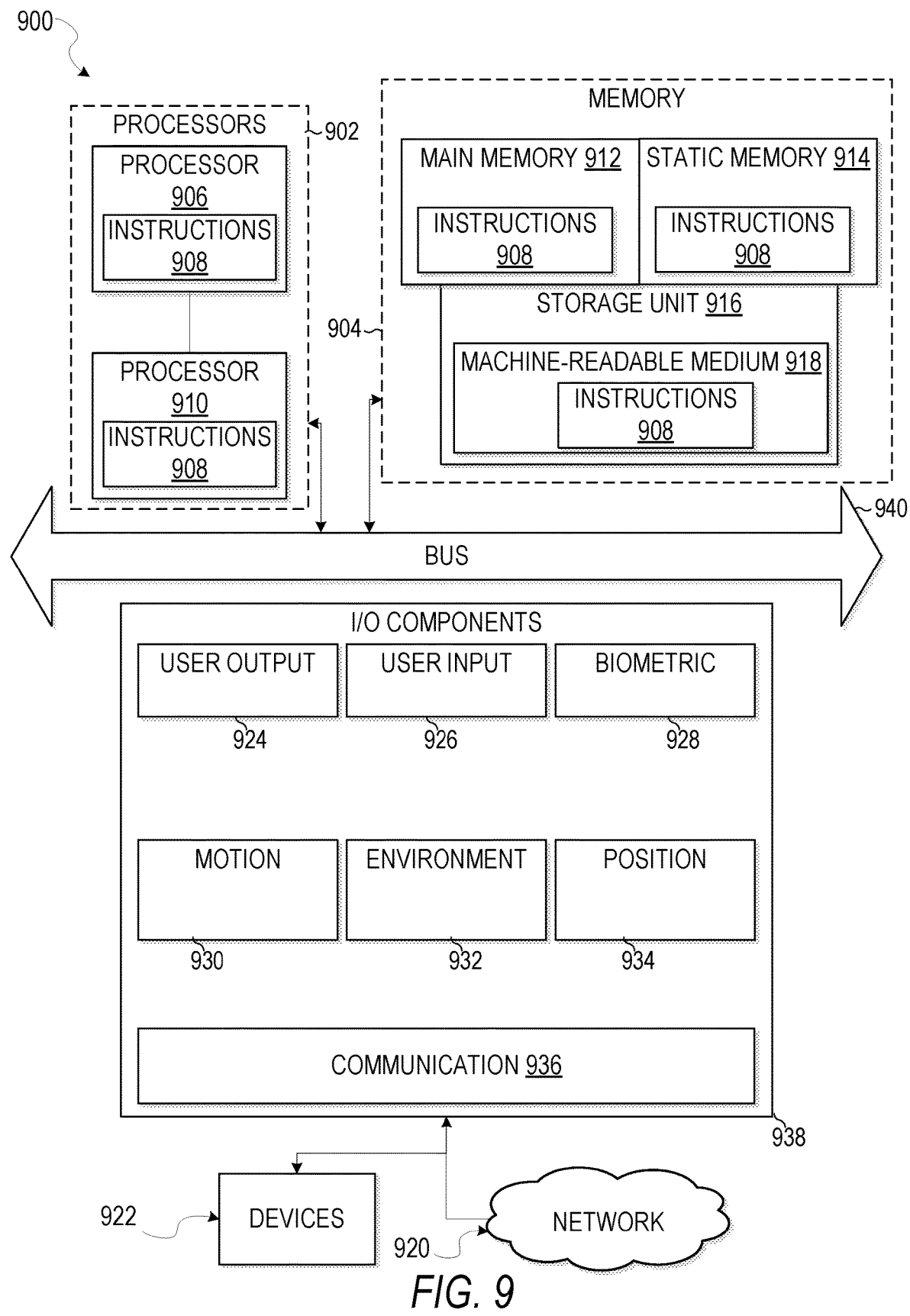
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output (I/O) components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 940. The main memory 904, the static memory 914, and the storage unit 916 store the instructions 908 embodying any one or more of the methodologies or functions described herein. The instructions 908 may also reside, completely or partially, within the main memory 912, within the static memory 914, within a machine-readable medium within the storage unit 916, within at least one of the processors 902 (e.g., within the processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, and rotation sensor components (e.g., gyroscope).

The environmental components 932 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., HTTP). Similarly, the instructions 908 may be transmitted or received using a transmission medium via a coupling (e.g., a peer-to-peer coupling) to the devices 922.

Software Architecture

Figure 10:
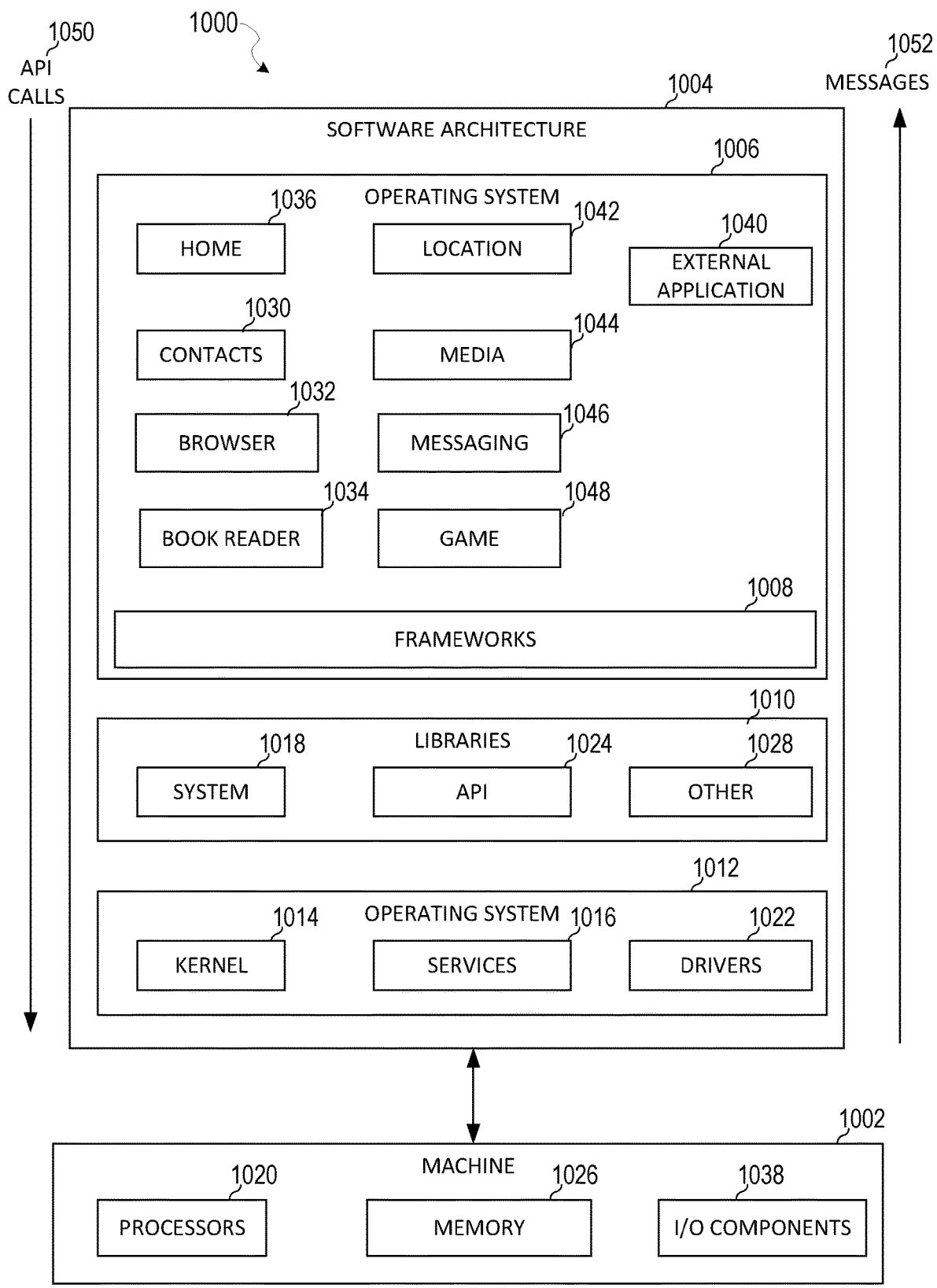
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLU- ETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various GUI functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as an external application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the external application 1040 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the external application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, PDAs, smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
   accessing, by a messaging application, an infrared and visible light capture system for controlling placement of a plurality of filters configured to block IR light and visible light;
   receiving, by the messaging application, a request to generate an augmented reality (AR) experience;
   based on the request to generate the AR experience by the messaging application, causing the infrared and visible light capture system to place a first filter configured to block infrared (IR) light in a light path from light emitted by a real-world environment to an image sensor of a camera of a device via one or more lenses;
   capturing, by the camera of the device, a first image comprising visible light representing a real-world environment;
   receiving a strobe signal for capturing an IR image by the camera; and
   in response to receiving the strobe signal:
   instructing an IR illumination device to temporarily turn ON;
   while the IR illumination device is instructed to temporarily turn ON, placing a second filter in the light path associated with the one or more lenses of the camera to pass IR light to an image sensor of the camera and block visible light, the one or more lenses of the camera being positioned between the first filter configured to block infrared light and the second filter configured to block visible light;
   capturing a second image comprising IR illumination of the real-world environment;
   after the second image comprising the IR illumination of the real-world environment has been captured, instructing, by the infrared and visible light capture system, the IR illumination device to turn OFF;
   based on the request to generate the AR experience by the messaging application, causing the infrared and visible light capture system to place the first filter in the light path after the second image is captured to allow visible light to pass through to the image sensor of the camera;
   processing the first image to determine one or more visible properties of the real-world environment; and
   processing the second image to detect one or more objects depicted in the first image of the real-world environment, the second image being processed by a trained neural network.

2. The method of claim 1, wherein the first image comprises red, green, and blue pixels depicting the real-world environment.

3. The method of claim 1, further comprising:
   activating an IR illumination device on the device in response to receiving the strobe signal, and wherein the second image is captured after the IR illumination device is activated.

4. The method of claim 1, wherein the first filter is placed in front of the one or more lenses of the camera.

5. The method of claim 1, wherein the second filter is placed between the one or more lenses of the camera and the image sensor of the camera.

6. The method of claim 1, wherein the first filter comprises an IR filter.

7. The method of claim 1, further comprising controlling one or more user interface elements based on the one or more objects detected using the second image.

8. The method of claim 1, wherein the one or more objects include a hand of a person.

9. The method of claim 1, further comprising:
   multiplexing a first set of images representing visible light and a second set of images representing IR illumination, the first set of images and second set of images being captured by the image sensor of the camera.

10. The method of claim 1, wherein the device comprises an augmented reality (AR) wearable device, wherein the first image comprising the visible light and the second image comprising the IR illumination of the real-world environment are processed by one or more machine learning models to generate one or more AR experiences.

11. The method of claim 1, further comprising:
    mechanically moving the first filter into a position to receive light passing towards the image sensor.

12. The method of claim 1, further comprising:
    electronically activating the second filter to pass the IR light.

13. The method of claim 12, wherein the second filter comprises a micro-electro-mechanical systems (MEMS) filter.

14. A system comprising:
    at least one processor configured to perform operations comprising:
    accessing, by a messaging application, an infrared and visible light capture system for controlling placement of a plurality of filters configured to block IR light and visible light;
    receiving, by the messaging application, a request to generate an augmented reality (AR) experience;
    based on the request to generate the AR experience by the messaging application, causing the infrared and visible light capture system to place a first filter configured to block infrared (IR) light in a light path from light emitted by a real-world environment to an image sensor of a camera of a device via one or more lenses;
    capturing, by the camera of the device, a first image comprising visible light representing a real-world environment;
    receiving a strobe signal for capturing an IR image by the camera; and
    in response to receiving the strobe signal:
    instructing an IR illumination device to temporarily turn ON;
    while the IR illumination device is instructed to temporarily turn ON, placing a second filter in the light path associated with the one or more lenses of the camera to pass IR light to an image sensor of the camera and block visible light, the one or more lenses of the camera being positioned between the first filter configured to block infrared light and the second filter configured to block visible light;
    capturing a second image comprising IR illumination of the real-world environment;
    after the second image comprising the IR illumination of the real-world environment has been captured, instructing, by the infrared and visible light capture system, the IR illumination device to turn OFF;
    based on the request to generate the AR experience by the messaging application, causing the infrared and visible light capture system to place the first filter in the light path after the second image is captured to allow visible light to pass through to the image sensor of the camera;

processing the first image to determine one or more visible properties of the real-world environment; and processing the second image to detect one or more objects depicted in the first image of the real-world environment, the second image being processed by a trained neural network.

15. The system of claim 14, wherein the first image comprises red, green, and blue pixels depicting the real-world environment.

16. The system of claim 14, the operations further comprising:
activating an IR illumination device on the device in response to receiving the strobe signal, the second image is captured after the IR illumination device is activated.

17. The system of claim 14, wherein the first filter is placed in front of the one or more lenses of the camera.

18. A non-transitory machine-readable storage medium that includes instructions that, when executed by one or more processors of a machine, cause the machine to perform operations comprising:
accessing, by a messaging application, an infrared and visible light capture system for controlling placement of a plurality of filters configured to block IR light and visible light;
receiving, by the messaging application, a request to generate an augmented reality (AR) experience;
based on the request to generate the AR experience by the messaging application, causing the infrared and visible light capture system to place a first filter configured to block infrared (IR) light in a light path from light emitted by a real-world environment to an image sensor of a camera of a device via one or more lenses;
capturing, by the camera of the device, a first image comprising visible light representing a real-world environment;
receiving a strobe signal for capturing an IR image by the camera; and
in response to receiving the strobe signal:
instructing an IR illumination device to temporarily turn ON;
while the IR illumination device is instructed to temporarily turn ON, placing a second filter in the light path associated with the one or more lenses of the camera to pass IR light to an image sensor of the camera and block visible light, the one or more lenses of the camera being positioned between the first filter configured to block infrared light and the second filter configured to block visible light;
capturing a second image comprising IR illumination of the real-world environment;
after the second image comprising the IR illumination of the real-world environment has been captured, instructing, by the infrared and visible light capture system, the IR illumination device to turn OFF;
based on the request to generate the AR experience by the messaging application, causing the infrared and visible light capture system to place the first filter in the light path after the second image is captured to allow visible light to pass through to the image sensor of the camera;
processing the first image to determine one or more visible properties of the real-world environment; and
processing the second image to detect one or more objects depicted in the first image of the real-world environment, the second image being processed by a trained neural network.

* * * * *